June 15, 1948. P. R. DANIEL 2,443,377
MACHINE FOR FORMING LOUVERED FINS FOR RADIATOR CORES
Filed Sept. 4, 1945 7 Sheets-Sheet 1

Fig.1.

Inventor
Palo R. Daniel
By E. V. Hardway
Attorney

June 15, 1948.   P. R. DANIEL   2,443,377
MACHINE FOR FORMING LOUVERED FINS FOR RADIATOR CORES
Filed Sept. 4, 1945   7 Sheets-Sheet 4

Fig.4.

Inventor
Palo. R. Daniel
By
E. V. Hardway
Attorney

June 15, 1948.　　　　P. R. DANIEL　　　　2,443,377
MACHINE FOR FORMING LOUVERED FINS FOR RADIATOR CORES
Filed Sept. 4, 1945　　　　7 Sheets-Sheet 5

Fig. 5.

Inventor
Palo R. Daniel

By E. V. Hardway
Attorney

June 15, 1948.  P. R. DANIEL  2,443,377
MACHINE FOR FORMING LOUVERED FINS FOR RADIATOR CORES
Filed Sept. 4, 1945  7 Sheets-Sheet 6

Inventor
Palo R. Daniel.
By E. V. Hardway,
Attorney

June 15, 1948.    P. R. DANIEL    2,443,377
MACHINE FOR FORMING LOUVERED FINS FOR RADIATOR CORES
Filed Sept. 4, 1945    7 Sheets—Sheet 7

Inventor
Palo R. Daniel
By
E. V. Hardway
Attorney

Patented June 15, 1948

2,443,377

UNITED STATES PATENT OFFICE 2,443,377

MACHINE FOR FORMING LOUVERED FINS FOR RADIATOR CORES

Palo R. Daniel, Houston, Tex.

Application September 4, 1945, Serial No. 614,201

6 Claims. (Cl. 153—2)

This invention relates to a machine for forming louvered fins for radiator cores.

An object of the invention is to provide a machine of the character described whereby a sheet of metal, or other suitable material, may be louvered and formed into flutes, or folds, and thus shaped to form the fins to be incorporated into a radiator core between the water circulating tubes thereof to form the air channels through the radiator.

Another object of the invention is to provide a machine of the character described which is readily adjustable to take sheets of material which may vary in width.

The invention also embodies a novel assembly of rollers for forming the louvers in the sheet material and for feeding said sheet to the shaper in a novel manner.

A further object of the invention is to provide, in a machine of the character described, a novel shaper for forming the louvered sheet into flutes, or folds.

With the above and other objects in view the invention has particular relation to certain novel features of construction, operation and arrangement of parts, an example of which is given in this specification and illustrated in the accompanying drawings, wherein—

Referring now more particularly to the drawings wherein like numerals of reference designate similar parts in each of the figures, the numeral 1 designates a support for the operating mechanism which is illustrated in the form of a table 1 supported on the corner legs 2.

Upstanding from this table and secured thereto are the posts 3, 3 which are oppositely arranged and whose upper ends support the cross beam 4 which is secured on said posts in any preferred manner.

Upstanding from the beam 4 and oppositely arranged and spaced apart are the side frame members 5, 5.

There is a transverse driving shaft 6 mounted to rotate in transversely aligned bearings in the posts 3, 3 and fixed on one end of said shaft there is a sheave 7. The sheave 7 may be driven in any suitable manner. As shown a motor 8 is provided whose shaft has a sheave 9 fixed thereon aligned with the sheave 7 and a belt 10 operates over said sheaves and transmits rotation from the former to the latter.

Fixed on the driving shaft 6 there is a spur gear wheel 11 which is in mesh with, and drives, a similar spur gear wheel 12 which is fixed on the crank shaft 13.

Upstanding from the table 1 and spaced apart and arranged behind the posts 3 are the posts 14, 14 having aligned bearings in which the shaft 13 is rotatably mounted.

Supported on the upper ends of the posts 14 there is a transverse plate 15 which is suitably secured to the posts 14.

Fixed on the outer ends of the shaft 13 are the circular heads 16, 16 whose outer end faces are formed with the dovetailed grooves 17, 17, extending transversely thereof.

Mounted in suitable bearings which are transversely aligned in the frame members 5 there is a shaft 18 and fixed on opposite ends of this shaft are the ratchet wheels 19 and 20 whose teeth are pitched in the same direction. Fixed on the shaft 18 between the frame members 5 there is the lower sheet-perforating and feeding roller 21 which will be more specifically described later; also fixed on the shaft 18 there are the spur gears 22, 22 which are in mesh with and drive the corresponding spur gears 23, 23. These last mentioned spur gears are fixed on a transverse shaft 24 which is mounted to rotate in bearings in the blocks 25, 25 in the corresponding frame members 5. These blocks are mounted for vertical movement in said frame members. Mounted on the frame members there is a transverse head-plate 26 which is suitably secured to said frame members and secured to the upper ends of the blocks 25 are the guide rods 27, 27 which extend upwardly through suitable bearings in the head plate 26. Surrounding said guide rods 27 and interposed between the respective blocks 25 and the head plate 26 are the coil springs 28, 28. Fixed on the shaft 24 between the frame members 5 there is the upper sheet-perforating and feeding roller 29 which co-operates with the roller 21 and which will be hereinafter described. The roller 29 is held yieldingly in co-operating relation with the roller 21 by means of the coil springs 28.

There are the dog-carrying levers 30, 31 which have bearings, at one end, on the shaft 18 adjacent the corresponding ratchet wheels 19, 20. These levers 30, 31 have the ratchet engaging dogs 32, 33 pivoted thereto at their outer ends and the other ends of these dogs are held yieldingly against the margins of said ratchet wheels by the corresponding pressure springs 34, 35 which are anchored, at one end, to the corresponding levers 30, 31 and whose other ends press against the corresponding dogs 32, 33 to maintain them in operative relation with the corresponding ratchet wheels 19, 20.

There are the connecting rods 36, 37 which are pivotally connected, at their upper ends, to the corresponding levers 30, 31 and whose lower ends have bearings on the aligned wrist pins 38 and 39. These wrists pins have their inner ends formed into heads 40, 41 which are dovetailed into the transverse grooves 17, 17 of the circular heads 16, 16. Accordingly as the shaft 13 is rotated the connecting rods 36, 37 will be reciprocated and the levers 30, 31 will be oscillated. As the levers 30, 31 are oscillated the dogs 32, 33 will be successively engaged with the teeth of the ratchet wheels 19, 20 and they will be intermittently rotated to rotate the shafts 18, 24 and the corresponding sheet-perforating and feeding rollers 21, 29.

Mounted on the transverse plate 15 there is a matrix 42 which is provided with the upstanding fluting, or folding, blades 43 which extend lengthwise with respect to the matrix but transversely with respect to the path of travel of the sheet to be fluted, or folded, and which are spaced a uniform distance apart. There are preferably four of these blades.

Above the matrix 42 there is a head 44 which has the depending blades 45 arranged in staggered relation with the blades 43 and adapted to intermesh with them. These blades 45 are provided with aligned, transverse slots 46, provided for a purpose to be hereinafter explained, and two of these slots are cut deeper than the others, these last mentioned slots being distinguished from the others by the numeral 46a. The purpose of the deep slots 46a will also be explained in connection with the explanation of the operation of the machine.

The head 44 is mounted within a correspondingly shaped recess 47 in the lower face of the crosshead 48 and the rear side of said recess 47 is enclosed by a removable plate 49. The crosshead 48 and plate 49 have the lower end slots 50 which are aligned with the extended slots 46a for a purpose to be later explained. The head 44 is attached to the upstanding rods 51, 51 which are connected to the respective ends thereof and which extend up through suitable aligned bearings in the crosshead 48. On the upper ends of the rods 51 are secured the nut assemblies 52, 52 forming heads for said rods to limit the downward movement of the head 44 relative to the crosshead 48. Surrounding the rods 51 and interposed between the head 44 and internal, downwardly facing shoulders 53 in the crosshead 48 are the coil pressure springs as 54 normally tending to hold the head 44 in its lower position with respect to the crosshead 48.

Connected, at their upper ends, to the respective ends of the crosshead 48 and depending therefrom are the rods 55, 55. These rods work through the sleeve bearings 56, 56 which are mounted in the transverse plate 15. A transverse shaft 57 has its ends mounted to rotate in transversely aligned bearings in the lower ends of the rods 55 and there are suitable connecting rods 58, 58 which are connected, at one end, to the shaft 57 and whose other ends have bearings on the eccentric wrists 59, 59 of the shaft 13. Accordingly as the shaft 13 is rotated the crosshead 48 will be moved up and down and will move the head 44 with it.

Figure 6:
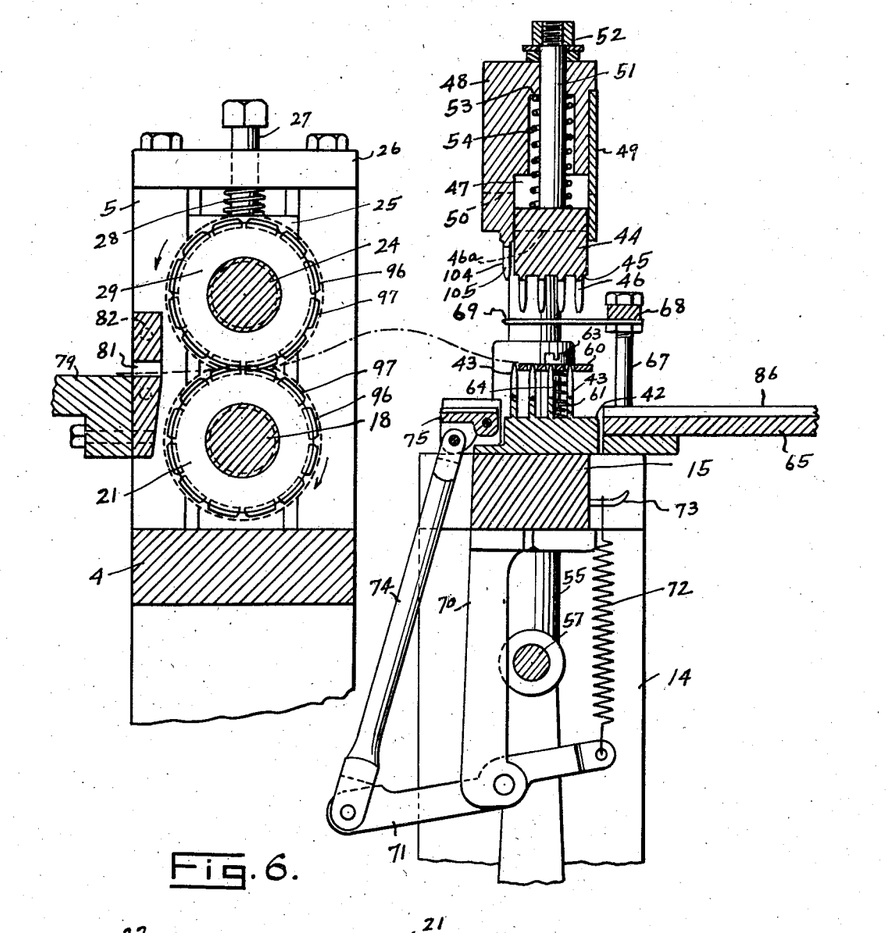
Figure 6 is an enlarged, fragmentary, longitudinal, sectional view taken on the line 6—6 of Figure 2.
Figure 7:
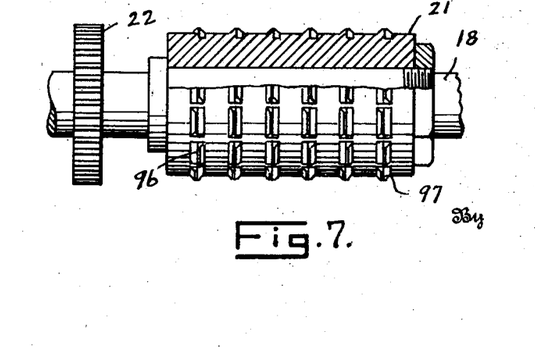
Figure 7 is an elevational view, partly in section, of one of the mating rollers for forming the louvers.

Co-operating with the matrix blades 43 there is a table 60 which is slotted lengthwise to receive the blades 43, as shown in Figure 6. This table is mounted to slide vertically on the end posts 61, 61 which are anchored, at their lower ends, to the matrix 42 and work through end bearings in said table and whose upper ends have the enlarged heads 63 to limit the upward movement of the table. This table is seated on coil springs 64 which surround the corresponding rods 61 and are supported on the matrix 42. When in its upper position against the heads 63 the upper surface of the table will be flush with the upper margins of the matrix blades 43.

Figures 8, 10, 11, 12:
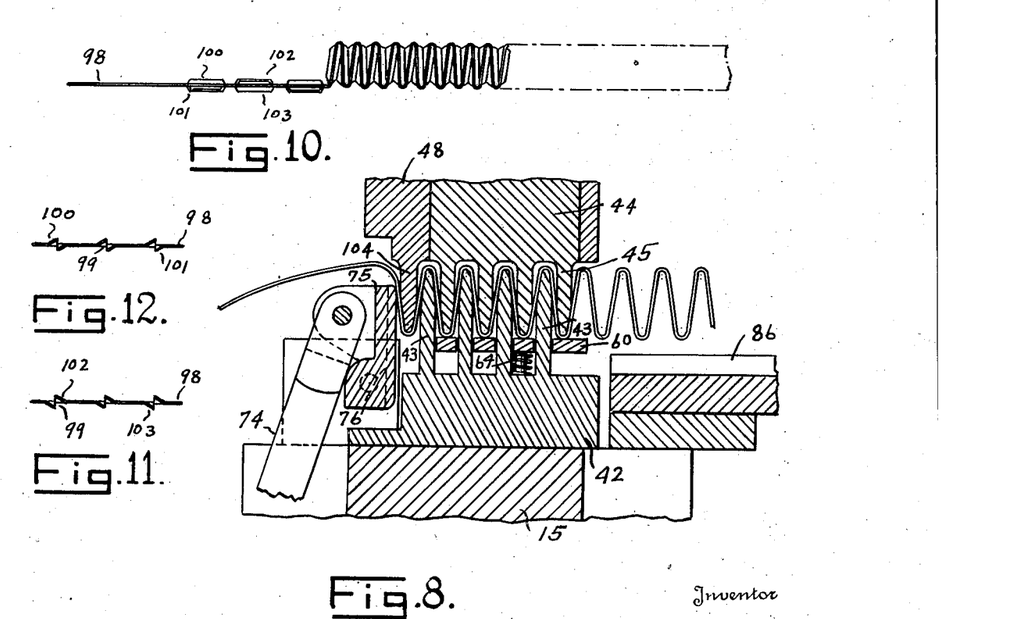
Figure 8 is an enlarged, fragmentary, vertical, sectional view taken on the line 6—6 of Figure 2 showing a detail of the shaper.
Figure 10 is an edge view thereof.
Figure 11 is a fragmentary, cross-sectional view of the louvered sheet taken on the line 11—11 of Figure 9.
Figure 12 is a cross-sectional view thereof taken on the line 12—12 of Figure 9.

The mechanism hereinabove described and shown mounted on the plate 15 and shown more in detail in Figures 6 and 8 may be designated as a shaper, for fluting, or folding, the sheet of material into the final shape of the fin. In front of the shaper there is a table 65 which is suitably secured to the head plate 15 in any peferred manner and leading off from the free margin of the table there is a delivery track 66. Upstanding from the head plate 15 on each side of the table there are the standards 67, 67 whose upper ends are connected by a bar 68 and extending rearwardly from the bar 68 are the stripper fingers 69, 69 which are spaced above the table 48 and which are aligned with the slots 46a, 50.

Depending from the plate 15 approximately midway between the ends thereof there is a bracket 70 and pivoted to the lower end of said bracket there is a lever 71. This lever is pivoted at a point intermediate its ends. There is a pull spring 72 connected, at one end, to one end of said lever and, at its other end, it is connected to an anchor 73 carried by the forward margin of the plate 15. One end of a link 74 is pivoted to the other end of the lever 71 and the other end of the link 74 has a pivotal connection with the jaw 75 which, in turn, has its lower end pivoted adjacent the rear margin of the matrix 42. The operative face of this jaw 75 has the spaced longitudinal grooves 76 the purpose of which will be explained in connection with the explanation of the operation of the machine. The lever 71 is arranged beneath the rod 57 and is perpendicular thereto and as said rod 57 moves downwardly and just before it reaches the limit of its downward movement it will engage one end of the lever 71 and will force the link 74 upwardly thus moving the jaw 75 into vertical, or operative, position and also placing the spring 72 under tension and when the rod 57 moves upwardly the spring 72 will operate to retract the jaw 75 in to horizontal position, as shown in Figure 6.

Upstanding from the table 1, at the rear of the machine, there are the supporting brackets 77, 77 provided to support the roll of sheet material to be formed into radiator fins. This material will usually be formed of copper or other similar, relatively soft, material which may be readily shaped as desired. The material may be of any desired width and the brackets 77 are adjustable accordingly.

Fastened to the rear side of the frame members 5 there is a horizontal receiving table 79 and at its rear end it supports a guide roller 80 over which the material passes as fed to the machine. The strip of material passes along the upper surface of the table 79 and through a transverse receiving opening 81 in the transverse brace 82 connecting the frame members 5 at their rear side. The co-operating surface of the sheet-perforating and feeding rollers 21, 29 are parallel with and on the same horizontal level as the receiving opening 81 and also on approximately the same horizontal level as the upper surface of the table 60 when said table is in its elevated position.

Figure 1:
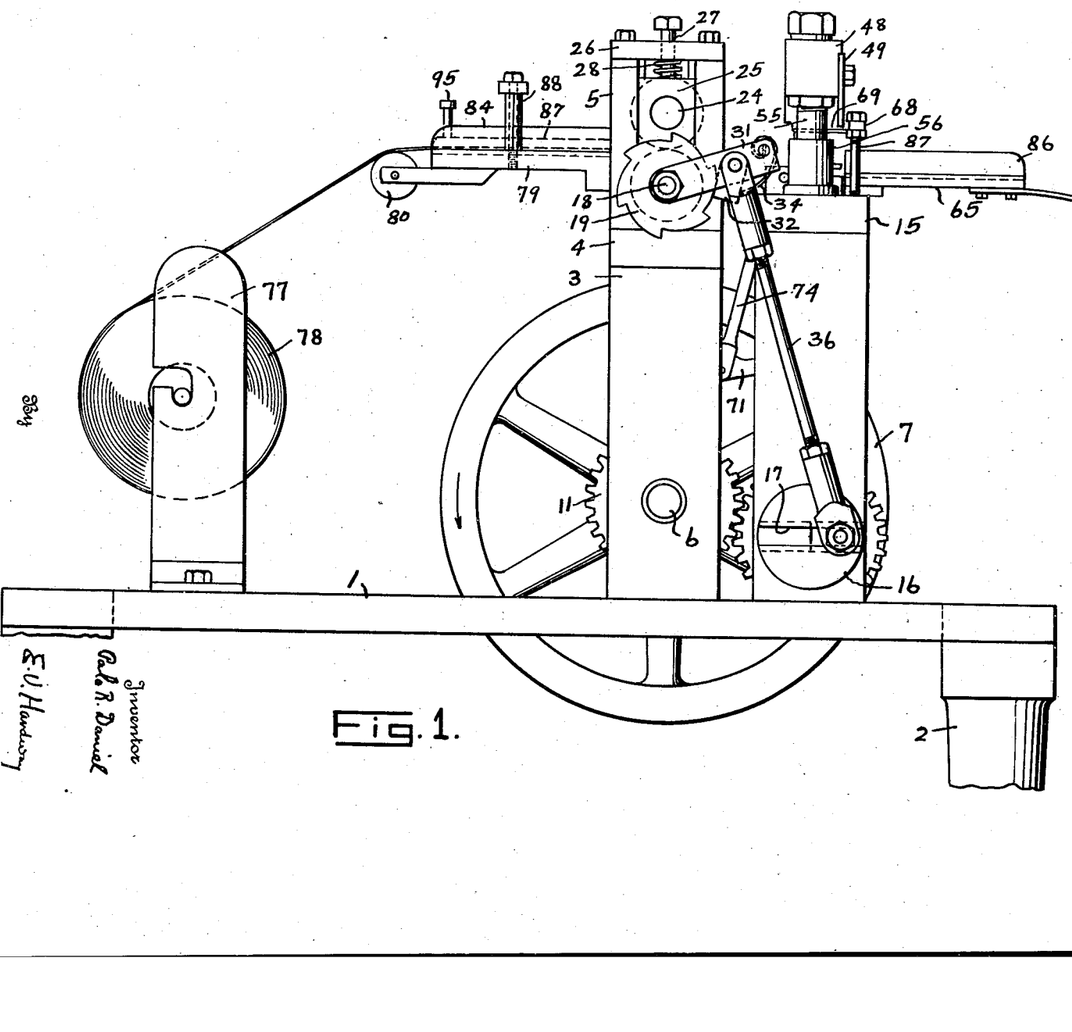
Figure 1 is a side view of the complete machine.
Figure 2:
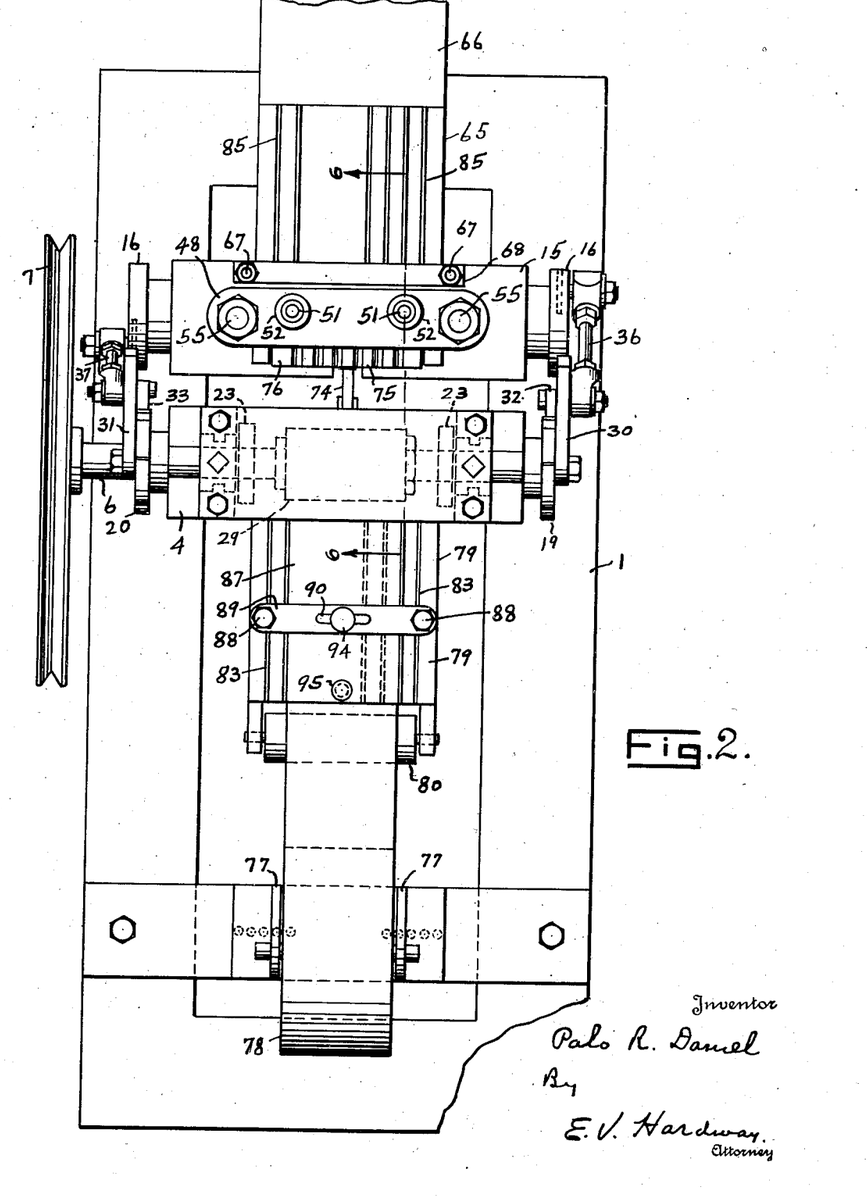
Figure 2 is a plan view thereof.
Figure 3:
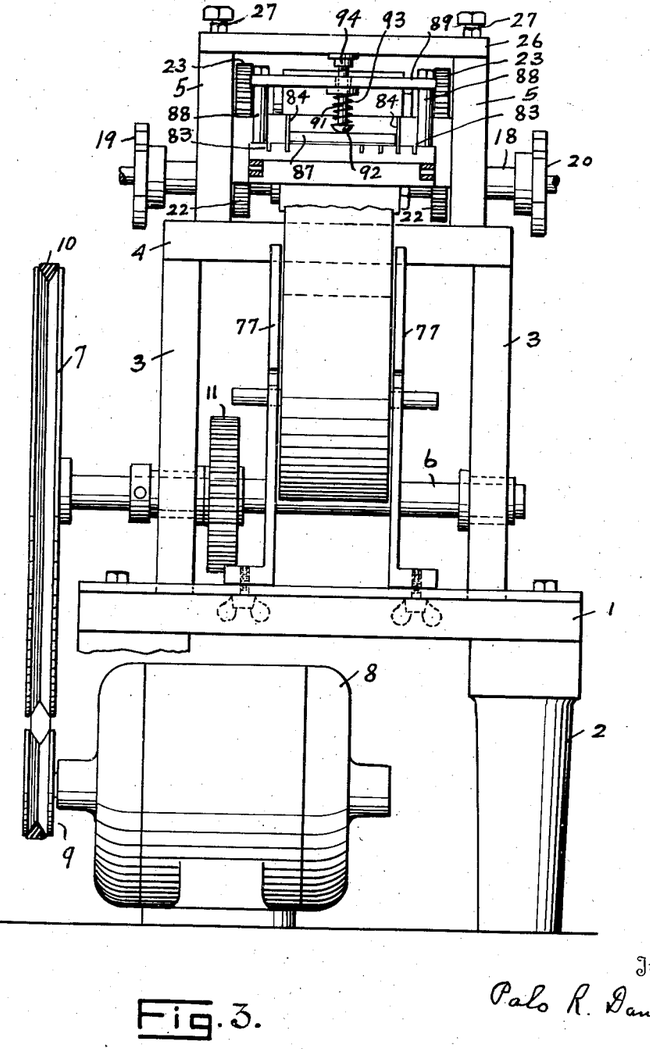
Figure 3 is a rear elevation shown partly in section.
Figure 4:
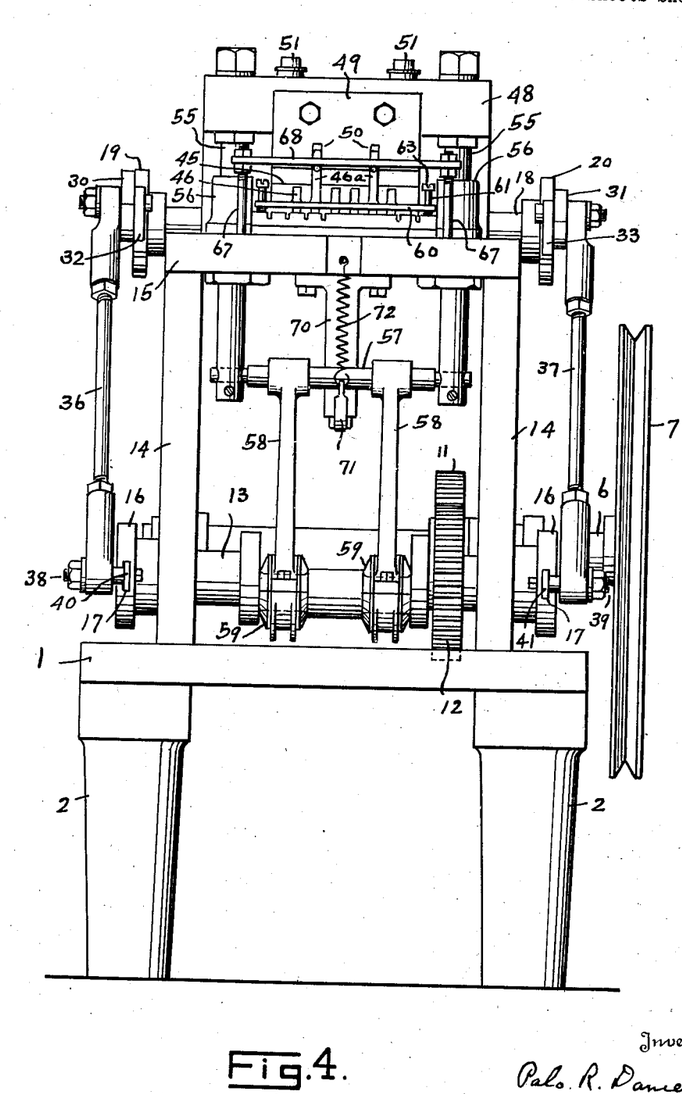
Figure 4 is a front elevation showing the delivery chute removed.
Figure 5:
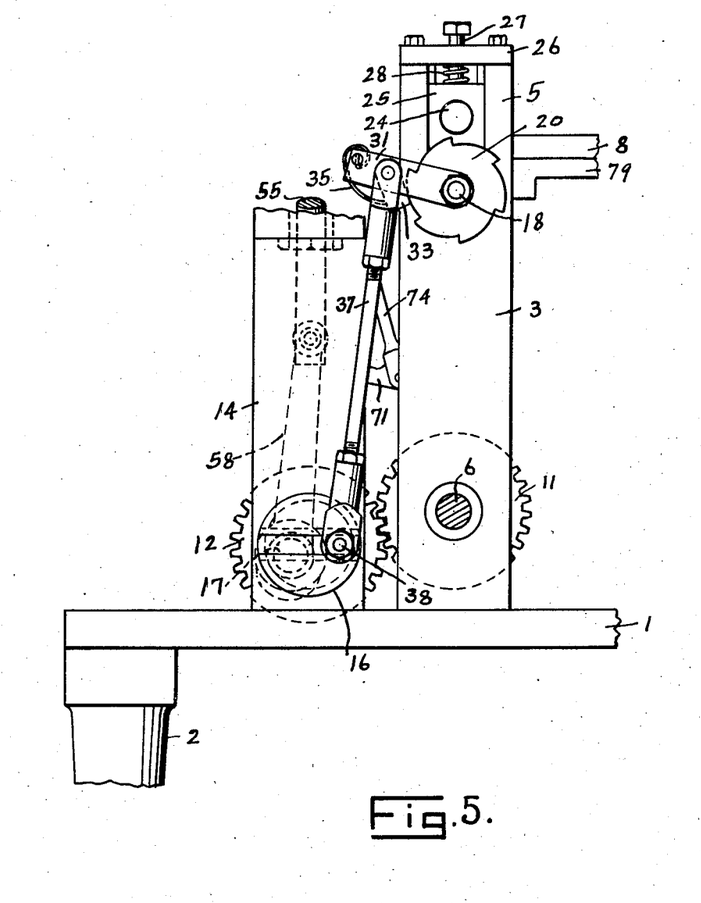
Figure 5 is a fragmentary, side elevation, partly in section.

As will be noted from an inspection of Figure 2 the upper surface of the table 79 is provided with the longitudinal grooves 83. These grooves are provided to receive the lower margins of the side plates 84, 84 which serve as guides for the strip of material passing through the machine. This is best shown in Figures 1, 2 and 3. In the upper surface of the delivery table 65 there are similar longitudinal grooves as 85 to receive the side plates 86 which guide the finished fin onto the delivery track 66. It is obvious that the guide plates 83, 85 may be adjusted toward and from each other depending on the width of the strip of material passing along the table 79, 65.

Between the side plates 84 there is a pressure plate 87 which is co-extensive, in length, with the length of the table 79 and which overlies the strip of material passing through the machine.

Upstanding from the table 79 on opposite sides of the material track there are the supporting posts 88, 88 whose upper ends support a cross yoke 89. This cross yoke has a central, longitudinal slot 90 and a rod 91 passes downwardly through said slot and its lower end has an oval head 92 which bears against said pressure plate 87. Surrounding said rod and interposed between said head and the yoke there is a coil pressure spring 93 which applies pressure to the plate 87 and holds it yieldingly against the strip of material being fed to the machine. The rod 91 has a grip member 94 at its upper end for releasing the head 92 from the plate and the outer end of said plate is provided with a handle 95 whereby the pressure plate may be conveniently handled.

Figures 9, 13:
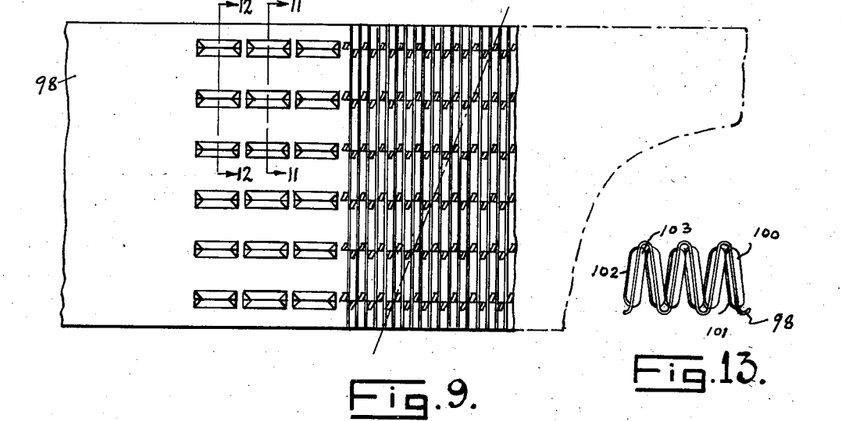
Figure 9 is a plan view of the louvered sheet shown partly fluted, or folded, into a finished fin.
Figure 13 is an enlarged, end view of the fin.

Referring now more specifically to the sheet-perforating and feeding rollers 21, 29, it will be noted that they are each provided with longitudinal series of transversely elongated shearing teeth as 96, 97. The teeth of the series 96 are pitched in a direction the opposite of that of the teeth 97 of the adjacent series, it being understood that these series of teeth are alternately arranged on each roller. The teeth 96 of one roller cooperates, with shear-like effect, with the oppositely pitched teeth 97 of the other roller so that as the strip of metal passes between the rollers the strip of metal such as 98, Figure 9, will be formed with longitudinal rows of longitudinal slits as 99 with deflectors as 100, 101 thrown out on each side of the alternate slits of each row, as shown in Figure 12, and deflectors 102, 103 thrown out on each side of the other slits of each row as shown in Figure 11, the deflectors 100, 101 being pitched in opposite directions and likewise the deflectors 102, 103, being also pitched in opposite directions.

In operation the roll 78 of material to be slitted is mounted between the supporting brackets 77, as shown in Figures 1, 2 and 3 and the free end of the material is fed between the sheet-perforating and feeding rollers 21, 29, as indicated in Figure 1 and as shown in dotted lines in Figure 6, and as the strip of material passes between said rollers it is slitted and the deflectors are thrown out on opposite sides of the slits, as indicated in Figures 9 to 12, inclusive, and the slitted material passes on through the shaper. The sheet-perforating and feeding rollers are rotated intermittently through connecting rods 36, 37 and the ratchet wheels 19, 20 and dogs 32, 33 associated therewith. It is to be noted that the wrist pins 38, 39 may be adjusted radially relative to the heads 16 and fixed at any desired point of adjustment so as to regulate the throw of the connecting rods 36, 37. It is contemplated that the connecting rod 36 will have a longer throw, or stroke, than the connecting rod 37 and corresponding dogs are so arranged relative to the teeth of the corresponding ratchet wheels 19, 20 that the ratchet wheel 19, and the feed rollers will be rotated through a 45° angle with each partial rotation of the ratchet wheel 19 and the ratchet wheel 20 and the feed rollers will be rotated through a 15° angle with each partial rotation of the ratchet wheel 20, the dogs and corresponding ratchet wheels being so adjusted that when one dog is operating to rotate its ratchet wheel the other dog will be moving idly.

As the perforated strip passes through the shaper it will be fluted, or folded, into the form shown in Figure 8, in the following manner. As the machine operates to perforate the sheet of material the cross head 48 will be reciprocated by means of the connecting rods 58. As it moves downwardly the head 44 and the fluting blades 45 depending therefrom will move in advance of the crosshead and said blades will engage the material on the table 60 and will force said material and table downwardly into the position shown in Figure 8 thus fluting, or folding, the sheet-like material between said interfitting blades. As the head 44 moves downwardly the slots 46a therein will receive the stripper fingers 69. The downward movement of the head 44 is thus arrested but the crosshead 48 continues to move on downwardly compressing the springs 54 and the slot 50 in the crosshead 48 receiving said stripper fingers 69. While this additional downward movement of the crosshead 48 is taking place the sheet-perforating and feeding rollers will be rotated 45°, as hereinabove explained, so as to feed sufficient of the sheet material through the feed rollers to provide the required amount of slack in the sheet between the feeding rollers and the shaper, as indicated in dotted lines in Figure 6, and the crosshead 48 is provided with a downwardly directed folding blade 104 which moves down closely alongside the adjacent blade 43 of the matrix, as clearly illustrated in Figure 8, and simultaneous with such movement the cross rod 57 will have actuated the lever 71 which will operate through the link 74 to move the jaw 75 upwardly into vertical position, as shown in Figure 8, to complete the fold about the blade 104 and thus take up said slack. This arrangement for providing slack material is essential as otherwise the tension on the sheet of material in making a fold would cause the strip to separate. When the fold is completed about the fluting blade 104 the crosshead 48 is elevated through the operation of the connecting rods 58 and upon engagement of the cross head 48 with the heads 52 on the rods 51 the head 44 and blades 45 carried thereby will be elevated and the springs 64 will elevate the table 60 so as to clear the fluted section of the material from blades 43. Should this fluted section cling to the blades 45 it will be stripped therefrom by the stripper fingers 69 and will then be supported on the table 60 and upon the next succeeding partial rotation of the feeding rollers the material will be advanced a distance equal to a 15° rotation of said feeding rollers since the next succeeding rotation will be effected through the connecting rod 37, the dog 33 and the ratchet wheel 20. The fluted section will thus be moved transversely across the table a distance equal to the distance between the adjacent matrix spaces of the matrix 42 and upon the next downward movement of the head 44 the last mentioned completed fold will be forced down into the first matrix space between the blades 43 and the three last preceding folds will be forced down into the other matrix spaces and thereupon another fold will be made as hereinabove explained and so on. The fluted, or folded, fin after leaving the shaper passes over the table 65 between the guide plates 85 and thence onto the delivery track 66 for delivery.

It should be noted that the operative face of jaw 75 is provided with the grooves 76 and the folding blade 104 has the slots 105 opposite said grooves so that during the folding operation the deflectors 100, 101 and 102, 103 may register with these grooves and slots and not be pressed back into the plane of the sheet 98 while the fold is being made. It is to be further noted that the blades 45 are provided with slots 46 and the blades 43 are provided with slots which register with the slots 46 and these slots are positioned so as to receive the corresponding deflectors 100, 101 and 102, 103 during the passage of the fin through the shaper so that the deflectors will not be pressed back into the plane of the sheet 98 during the fluting, or folding, process.

It is to be understood that the fins, when completed by the machine, will be assembled with the water circulating tubes of radiator cores. The radiators referred to are to be used in connection with internal combustion motors such as the motors of motor vehicles and the flutes of the fins will extend fore and aft thus forming air channels. It is very important that the fins be louvered, that is slitted with deflectors on opposite sides of the slits. These deflectors deflect part of the air from flute to flute causing a diagonal cross current as indicated by the diagonal line shown on Figure 9. These cross currents will intercept the currents flowing through the flutes and will retard the air flow and cause a turbulence of air within the radiator core thus giving a better cooling effect.

The drawings and description are illustrative merely while the broad principle of the invention will be defined by the appended claims.

What I claim is:

1. A machine for forming fins for radiator cores comprising, co-operating feed rollers arranged to receive a strip of metal between them, means for rotating the rollers to feed the strip, co-operating shear teeth on the rollers effective to form transverse series of perforations in the strip, relatively reciprocable members between which the strip is fed by the rollers, said members having co-acting parts which fold the strip between the series of perforations to form flutes in the strip, said co-acting parts including an independently operable jaw arranged to initially form each fold.

2. A machine for forming fins for radiator cores comprising, co-operating feed rollers arranged to receive a strip of metal between them, means for rotating the rollers to advance the strip, longitudinal series of elongated shearing teeth on each roller the teeth of one roller being arranged to co-operate with the teeth of the other roller with shear-like effect to form transverse series of slits through the strip, said teeth being shaped to throw out, from the material of the strip, deflectors on opposite sides of each slit, the deflectors of each slit being pitched in opposite directions, relatively reciprocable members between which the strip is fed by the rollers, said members having co-acting parts which fold the strip between the series of slits to form transverse flutes in the strip.

3. A machine for forming fins for radiator cores comprising, co-operating feed rollers arranged to receive a strip of metal between them, means for rotating the rollers to advance the strip, longitudinal series of shearing teeth on each roller the teeth of one roller being arranged to co-operate with the teeth of the other roller to form transverse series of slits through the strip, said teeth of one series being arranged adjacent the corresponding teeth of the other series to form pairs of teeth which are reversely pitched to throw out, from the material of the strip, deflectors on opposite sides of each slit, the deflectors of each slit being pitched in opposite directions, relatively reciprocable members between which the strip is fed by the rollers, said members having co-acting parts which fold the strip between the series of slits to form transverse flutes in the strip, said co-acting parts having relief spaces to receive the deflectors during the folding operation.

4. A machine for forming fins for radiator cores comprising, a shaper including a matrix and a reciprocable member arranged to receive a strip of material between them, said matrix and reciprocable member having co-acting parts which operate on the strip between them to form the strip into folds strip advancing means operable intermittently to, alternately, create slack in the advancing strip to provide slack material for the initial folding operations and to, thereafter, advance the folded strip through the shaper.

5. A machine for forming folds in a strip of material comprising, relatively reciprocable members having co-operating elements movable into active and inactive positions to successively form folds in the material as the strip is advanced between the members, shaping means on the reciprocable members arranged to receive the previously formed folds as the strip is advanced, means for relatively reciprocating said members to move the shaping means into active or released positions, means for intermittently advancing the strip to advance the folds through the shaping means when the shaping means are in released position and said advancing means being operable to create slack in the advancing strip, when said shaping means are in active position, to provide slack material for the next succeeding fold.

6. A machine for forming folds in a strip of thin material comprising, relatively reciprocable members having co-operating elements movable into active and inactive positions to successively form folds in the material as the strip is advanced, one of said elements being a pivotally mounted jaw, means causing movement of said elements in unison into said active and inactive positions, shaping means on the reciprocable members arranged to receive the previously formed folds as the strip is advanced, means for intermittently advancing the strip to advance the folds through the shaping means when the shaping means are in released, or inactive, position and said advancing means being timed to create slack in the advancing strip, when said shaping means are in active position, to provide slack material for the next succeeding fold.

PALO R. DANIEL.

REFERENCES CITED

The following references are of record in the file of this patent:

UNITED STATES PATENTS

| Number | Name | Date |
|---|---|---|
| 1,149,356 | Fedders | Aug. 10, 1915 |
| 1,484,600 | Witte | Feb. 19, 1924 |
| 1,496,393 | Topale | June 3, 1924 |
| 1,511,349 | Lober | Oct. 14, 1924 |
| 1,546,195 | Briskin | July 14, 1925 |
| 2,000,208 | Balfe | May 7, 1935 |
| 2,089,326 | Bailey | Aug. 10, 1937 |
| 2,397,582 | Watt et al. | Apr. 2, 1946 |